(12) United States Patent
Angenheister et al.

(10) Patent No.: US 8,322,781 B2
(45) Date of Patent: Dec. 4, 2012

(54) HYBRID CROSS BAR FOR A VEHICLE AND METHOD FOR PRODUCING AND FOR INSTALLING A HYBRID CROSS BAR

(75) Inventors: Paul Angenheister, Tonisvorst (DE); Thomas Beer, Grefrath (DE); Alfred Mai, Huckeswagen (DE); Klaus Kierspel, Rösrath (DE); Norberto Silva, Essen (DE); Jochen Zimmermann, Wuppertal (DE); Viktor Arbanas, Baden (CH); Michael Maag, Buchs (CH); Carsten Manneck, Feldkirch (AT); Max Oertle, Mauren (LI); Christian Dornscheidt, Düsseldorf (DE); Matthias Hein, Gelsenkirchen (DE); Martin Hinz, Issum (DE); Mark Hirt, Bochum (DE); Peter Seyfried, Dortmund (DE); Markus Zörnack, Dortmund (DE)

(73) Assignee: Johnson Controls Technology Company, Holland, MI (US)

( * ) Notice: Subject to any disclaimer, the term of this patent is extended or adjusted under 35 U.S.C. 154(b) by 243 days.

(21) Appl. No.: 12/401,507

(22) Filed: Mar. 10, 2009

(65) Prior Publication Data
US 2009/0250973 A1 Oct. 8, 2009

Related U.S. Application Data

(63) Continuation of application No. PCT/EP2007/007905, filed on Sep. 11, 2007.

(30) Foreign Application Priority Data

Sep. 11, 2006 (DE) .......................... 10 2006 043 262

(51) Int. Cl.
B62D 25/14 (2006.01)
(52) U.S. Cl. ... 296/193.02; 296/70; 296/72; 296/187.12
(58) Field of Classification Search ............ 296/193.02, 296/187.09, 187.12, 203.02, 203.03, 70, 296/72; 180/90
See application file for complete search history.

(56) References Cited

U.S. PATENT DOCUMENTS

| 4,410,208 A | * | 10/1983 | Mulso et al. ................. 293/132 |
| 4,465,312 A | * | 8/1984 | Werner ........................ 293/132 |
| 5,564,769 A | * | 10/1996 | Deneau et al. ................. 296/72 |

(Continued)

FOREIGN PATENT DOCUMENTS

DE 102004025245 A1 12/2005
(Continued)

OTHER PUBLICATIONS

International Search Report for application No. PCT/EP2007/007905 mailed Nov. 30, 2007.

*Primary Examiner* — Glenn Dayoan
*Assistant Examiner* — Gregory Blankenship
(74) *Attorney, Agent, or Firm* — Fletcher Yoder P.C.

(57) ABSTRACT

A hybrid cross bar is provided, such as for supporting a vehicle dash board. The cross bar is supported, directly or indirectly, on at least one body location of the vehicle by a deformation element. The deformation element has a first sub-region enclosed by a plastic encapsulation. A second sub-region of the deformation element has a deformation region outside of the plastic encapsulation.

6 Claims, 2 Drawing Sheets

U.S. PATENT DOCUMENTS

| | | | |
|---|---|---|---|
| 5,931,520 A * | 8/1999 | Seksaria et al. | 296/70 |
| 6,059,331 A * | 5/2000 | Mori | 293/133 |
| 6,174,009 B1 * | 1/2001 | McKeon | 293/133 |
| 6,364,384 B1 * | 4/2002 | Kemp et al. | 293/120 |
| 6,422,633 B2 * | 7/2002 | Neuss et al. | 296/70 |
| 6,447,041 B1 * | 9/2002 | Vandersluis et al. | 296/72 |
| 6,481,786 B1 * | 11/2002 | Kim | 296/203.02 |
| 6,688,680 B1 | 2/2004 | Cooper et al. | |
| 6,869,123 B2 * | 3/2005 | Marks et al. | 296/70 |
| 6,988,764 B2 * | 1/2006 | Matsutani | 296/193.02 |
| 7,048,325 B1 * | 5/2006 | Sandhu | 296/193.02 |
| 7,066,509 B2 * | 6/2006 | Kollaritsch et al. | 293/133 |
| 7,128,360 B2 * | 10/2006 | Scheib et al. | 296/70 |
| 7,188,877 B2 * | 3/2007 | Gonzalez et al. | 293/133 |
| 7,213,867 B2 * | 5/2007 | Haneda et al. | 296/132 |
| 7,216,927 B2 * | 5/2007 | Luo et al. | 296/193.02 |
| 7,264,295 B2 * | 9/2007 | Vander Sluis et al. | 296/70 |
| 7,407,206 B2 * | 8/2008 | Arns et al. | 293/133 |
| 7,568,756 B2 * | 8/2009 | Meier | 296/193.02 |
| 7,806,467 B2 * | 10/2010 | Sangu | 296/203.04 |
| 7,810,873 B2 * | 10/2010 | Hitz et al. | 296/193.02 |
| 7,891,726 B2 * | 2/2011 | Gavrilov | 296/187.05 |
| 2004/0262954 A1 * | 12/2004 | Scheib et al. | 296/193.02 |
| 2005/0264040 A1 * | 12/2005 | Bailey et al. | 296/193.02 |
| 2006/0119139 A1 * | 6/2006 | Luo et al. | 296/203.02 |

FOREIGN PATENT DOCUMENTS

FR  2783794 A  9/1998

* cited by examiner

HYBRID CROSS BAR FOR A VEHICLE AND METHOD FOR PRODUCING AND FOR INSTALLING A HYBRID CROSS BAR

CROSS REFERENCE TO RELATED APPLICATIONS

This application claims priority from and the benefit of PCT Application No. PCT/EP2007/007905, filed on Sep. 11, 2007; and German Patent No. DE 10 2006 043 262.2, filed on Sep. 11, 2006; both entitled "Hybrid Cross Bar for a Motor Vehicle and Method for the Production and for the Installation of a Hybrid Cross Bar", which are herein incorporated by reference.

BACKGROUND

The present invention relates to a hybrid cross bar for a motor vehicle, wherein the support of the hybrid cross bar is provided directly or indirectly on at least one body location of the motor vehicle by means of a deformation element, wherein the deformation element is provided in a first sub-region in such a manner that it is enclosed by means of a plastic encapsulation. The present invention also relates to a method for producing and for installing a hybrid cross bar.

Hybrid cross bars are generally known. By way of example, German laid-open specification DE 10 2004 025 245 A1 discloses a hybrid cross bar for motor vehicles, wherein metal inserts which are connected to the plastic dashboard are provided in order to attach the hybrid cross bar to the A pillar of a motor vehicle. The metal inserts have fins (reference symbol 22) which are enclosed in a plastic matrix. A disadvantage of this is that it is not possible to check the state of the fins, in particular deformation of the fins, for example after the vehicle has been involved in a collision or the like, because the fins are surrounded by the plastic matrix.

SUMMARY

The object of the present invention was therefore to provide a hybrid cross bar which does not have the disadvantages of the prior art.

This object is achieved by means of a hybrid cross bar for a vehicle, wherein the support of the hybrid cross bar is provided directly or indirectly on at least one body location of the motor vehicle by means of a deformation element, wherein the deformation element is provided in a first sub-region in such a manner that it is enclosed by means of a plastic encapsulation, wherein, furthermore, in a second sub-region, the deformation element has a deformation region which is provided outside the plastic encapsulation. This advantageously makes it possible to determine the state of the second sub-region of the deformation element, in particular the state of the deformation region in a situation, for example, after the vehicle has been involved in a collision, in a simple manner, for example by virtue of an inspection being performed at this location of the hybrid cross bar. According to the invention, this advantageously makes it possible to decide in a simple manner whether it is necessary to replace the hybrid cross bar completely, i.e. including the deformation element, after an accident has taken place. Furthermore, according to the invention, this makes it possible for the deformation of the deformation region not to be impaired by the embedding of the deformation region in the plastic matrix. This allows the deformation behavior of the deformation region to be accurately established.

It is preferred according to the invention if the second sub-region has an extension region. This particularly preferably makes it possible to absorb forces which are produced in the event of a head-on crash and, for example, push the two A pillars of the motor vehicle apart, such that the hybrid cross bar has to follow the movement of the A pillars without losing or rupturing the internal cohesion. Implementing the second sub-region at least partially as an extension region therefore makes it possible to provide a stable attachment of the hybrid cross bar to the body of the vehicle, and particularly to the A pillars of the vehicle, even after the motor vehicle has been involved in a severe head-on crash.

Furthermore, it is preferred according to the invention if the hybrid cross bar is intended to support the vehicle dashboard or if the vehicle body location is provided in the region of the A pillar of the vehicle. This makes it possible, in a particularly simple and inexpensive manner, to revert to proven design principles in the production and arrangement of vehicle components, and the hybrid cross bar according to the invention can therefore be produced and installed in a simple manner.

The present invention also relates to a method for producing and for installing a hybrid cross bar according to the invention, wherein, in a first step, the hybrid cross bar is produced by encapsulating the deformation element in the first sub-region and wherein, in a second step, the hybrid cross bar is installed by fastening the second sub-region of the deformation element to the vehicle body location. This makes it possible to provide a stable attachment of the hybrid cross bar in an optimum way in any vehicle or accident situations, i.e. in particular even after a severe head-on crash.

DRAWINGS

Exemplary embodiments of the invention are illustrated in the drawing and explained in more detail in the description below.

Figure 3A:
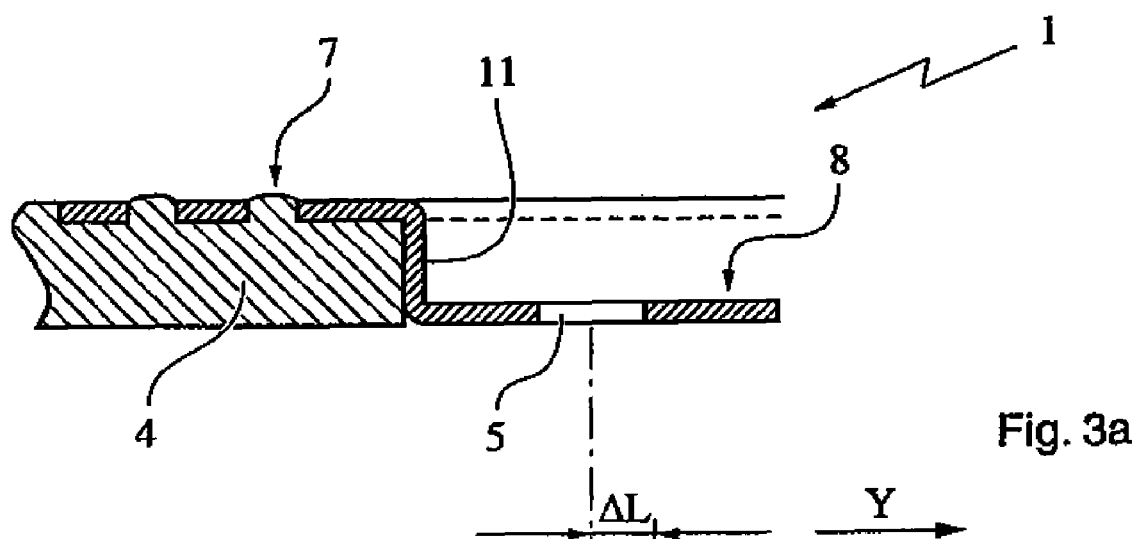
Figure 3B:
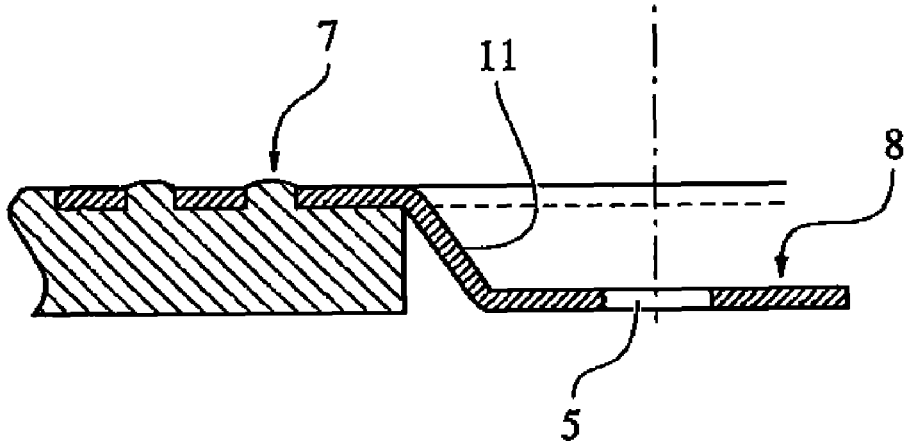

FIGS. 3a and 3b schematically show a cross section and, respectively, a longitudinal section through the deformation element.

DETAILED DESCRIPTION

Figure 1:
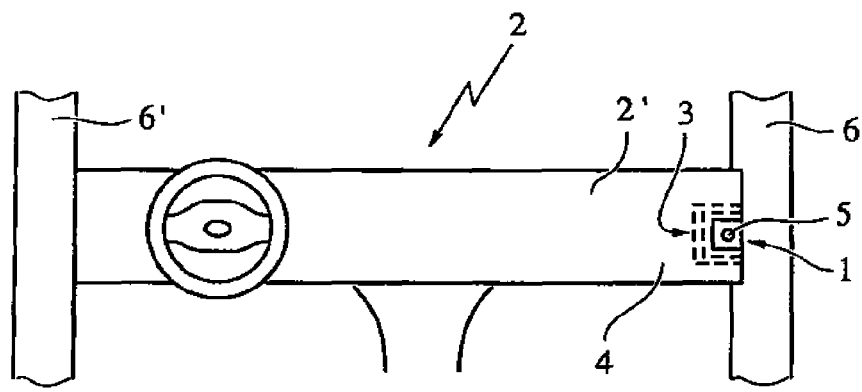
FIG. 1 shows a schematic view of a vehicle dashboard.

FIG. 1 illustrates a schematic view of a vehicle dashboard 2, in which the dashboard 2 is provided fastened to a first A pillar 6 and to a second A pillar 6'. Only the fastening to the first A pillar 6 is shown in more detail in FIG. 1. The motor vehicle dashboard 2 has a hybrid cross bar 2' which generally has a plurality of metal parts which are surrounded or enclosed or encapsulated by injection molding with a plastic material. The hybrid cross bar 2' is connected to the first A pillar 6 by means of an extension element 1. The plastic matrix of the hybrid cross bar 2' is denoted by the reference symbol 4 in FIG. 1. It can be seen in this figure that the deformation element 1 has a U-shaped peripheral edge region 3 which is embedded in the plastic matrix 4 of the hybrid cross bar 2' in a form-fitting manner. This region, embedded in the plastic matrix 4, of the deformation element 1 is also referred to below as the first sub-region of the deformation element 1, wherein the first sub-region is provided enclosed or encapsulated by means of the plastic encapsulation 4. The deformation element 1 and therefore the hybrid cross bar 2' are attached to the vehicle body (not denoted by means of a reference symbol) at a body location of the vehicle by means of a second sub-region 8 of the deformation element 1. In the example illustrated, the vehicle body location used for attaching the hybrid cross bar 2' is the A pillar 6 or the further A pillar 6'. In the example, the second sub-region 8 of the deformation element 1 is connected to the A pillar 6 or the vehicle body location 6 using, for example, screw holes and bolted connections.

Figure 2:
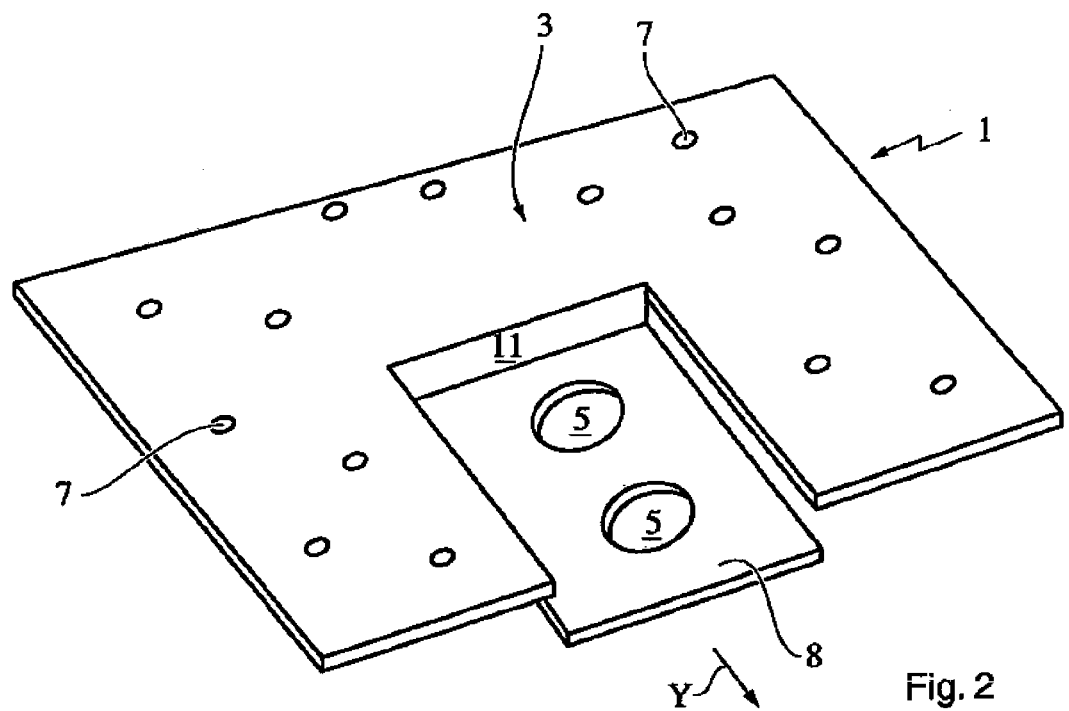
FIG. 2 shows an enlarged illustration of a deformation element.

FIG. 2 illustrates an enlarged illustration of the deformation element 1. The first sub-region 3 can be seen clearly but, in FIG. 2, it is illustrated not enclosed by means of the plastic encapsulation 4. The first sub-region 3 has openings 7 for connecting the deformation element 1 to the plastic encapsulation 4 in a form-fitting manner. The second sub-region 8 of the deformation element 1 is provided offset with respect to the first sub-region 3. For this purpose, the deformation element 1 has a side wall 11 which initially bears against the plastic matrix 4. If a force is exerted in the direction of the y axis (illustrated in FIG. 2), the second sub-region 8 is extended with respect to the first sub-region 3, providing extension, in particular, within the side wall 11. As a result, at least the side wall 11 provides a deformation region of the deformation element 1. The deformation behavior of the deformation element 1 can be varied and adapted to the respective intended application.

FIGS. 3a and 3b schematically illustrate a cross section and, respectively, a longitudinal section through the deformation element 1, wherein the state before deformation in the y direction (FIG. 3a) is illustrated and wherein the state after deformation in the y direction (FIG. 3b) is also illustrated. It can be seen that the side wall is provided as a deformation region and, in particular, as an extension region which ensures that secure attachment of the hybrid cross bar to the A pillars 6, 6' or, generally, to the vehicle body locations 6, 6' is maintained despite the A pillars 6, 6' being pushed apart from one another, for example as a result of an accident.

The deformation element is provided in particular as an extension element 1 which is produced from sheet steel and is initially provided by injection molding or enclosed in its first sub-region 3 with the plastic matrix 4 of the hybrid cross bar 2' or of the vehicle dashboard 2, and wherein, in the second sub-region 8 of the deformation element 1, the attachment to the body location 6, 6' of the motor vehicle is subsequently established and the hybrid cross bar is thus installed. It can be seen in FIGS. 3a and 3b that a change in length ΔL can be implemented, and this can compensate for a change in the distance between the A pillars 6, 6'.

The invention claimed is:

1. A hybrid cross bar for a motor vehicle comprising:
 a deformation element comprising:
  a first sub-region enclosed by a plastic encapsulation;
  a second sub-region configured to connect the hybrid cross bar to at least one body location of the motor vehicle, wherein the second sub-region is offset from the first sub-region; and
  a deformation region provided outside the plastic encapsulation, wherein the deformation region is configured to facilitate extension of the second sub-region relative to the first sub-region.

2. The hybrid cross bar of claim 1, wherein the deformation region comprises a sidewall extending between the first sub-region and the second sub-region, and establishing the offset between the first sub-region and the second sub-region.

3. The hybrid cross bar of claim 2, wherein the first sub-region and the second sub-region are substantially parallel to one another, and the sidewall is substantially perpendicular to the first and second sub-regions while the deformation region is in an undeformed state.

4. The hybrid cross bar of claim 3, wherein an orientation of the sidewall relative to the first and second sub-regions is configured to vary as the deformation region deforms to facilitate extension of the second sub-region relative to the first sub-region.

5. The hybrid cross bar of claim 1, wherein the hybrid cross bar is configured to support a vehicle dashboard.

6. The hybrid cross bar of claim 1, wherein the vehicle body location is in a region of an A pillar of the vehicle.

* * * * *